(12) United States Patent
Tabikh et al.

(10) Patent No.: US 10,232,328 B2
(45) Date of Patent: Mar. 19, 2019

(54) GAS MIXING ARRANGEMENT

(71) Applicant: ALSTOM Technology Ltd, Baden (CH)

(72) Inventors: Ali Tabikh, Växjö (SE); Anders Hjelmberg, Växjö (SE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 503 days.

(21) Appl. No.: 13/749,154

(22) Filed: Jan. 24, 2013

(65) Prior Publication Data
US 2013/0188440 A1    Jul. 25, 2013

(30) Foreign Application Priority Data

Jan. 25, 2012   (EP) .................................... 12152423

(51) Int. Cl.
*B01F 5/06* (2006.01)
*B01D 53/56* (2006.01)
(Continued)

(52) U.S. Cl.
CPC ............ *B01F 5/0618* (2013.01); *B01D 53/56* (2013.01); *B01D 53/79* (2013.01); *B01F 3/02* (2013.01);
(Continued)

(58) Field of Classification Search
CPC ...... B01F 5/061; B01F 5/0612; B01F 5/0616; B01F 5/0619; B01F 2005/062;
(Continued)

(56) References Cited

U.S. PATENT DOCUMENTS 846,751 A *   3/1907   Melvin ............................. 366/9
3,620,506 A * 11/1971   Stephen ................ B01F 5/0619
                                                      366/337
(Continued)

FOREIGN PATENT DOCUMENTS

CN           201108807 Y     9/2008
CN           101598359 A    12/2009
(Continued)

OTHER PUBLICATIONS

European Search Report, European Searching Authority, EP Application No. 12152423, Munich, Completed Sep. 18, 2012.
(Continued)

*Primary Examiner* — Marc C Howell
(74) *Attorney, Agent, or Firm* — GE Global Patent Operation; Rita D. Vacca (57) ABSTRACT

A gas mixing arrangement for mixing a process gas (MF) of a process plant, which arrangement comprises a gas duct (10a) for flow of said process gas, a mixing plate section (24) arranged in the gas duct (10a) and comprising at least one mixing plate (42, 44) arranged at an angle with respect to a main flow direction (C) of said process gas flowing through the gas duct (10a). The arrangement further comprises a guide vane section (22) arranged upstream of said mixing plate section (24) to cooperate therewith in mixing the process gas (MF) flowing through the gas duct (10a), the guide vane section (22) comprises a first group of guide vanes (26) arranged to direct a first gas flow portion (GP1) in a direction towards a first side wall (34) of the gas duct (10a), and a second group of guide vanes (28) arranged to direct a second gas flow portion (GP2) in a direction towards a second side wall (36) of the gas duct (10a), said second side wall (36) being opposite said first side wall (34).

15 Claims, 5 Drawing Sheets

(51) Int. Cl.
    *B01D 53/79*     (2006.01)
    *B01F 3/02*      (2006.01)

(52) U.S. Cl.
    CPC ............... *B01D 2251/2062* (2013.01); *B01D 2251/2067* (2013.01)

(58) Field of Classification Search
    CPC ...... B01F 2005/0628; B01F 2005/0625; B01F 2005/0626; B01F 2005/0627; B01F 5/0618
    USPC ........................................ 366/336, 337, 338
    See application file for complete search history.

(56) References Cited

U.S. PATENT DOCUMENTS

| | | | |
|---|---|---|---|
| 4,758,098 A   |    7/1988 | Meyer | |
| 4,824,614 A * |    4/1989 | Jones .............................. | 261/76 |
| 4,981,368 A   |    1/1991 | Smith | |
| 5,456,533 A   |   10/1995 | Streiff et al. | |
| 5,605,399 A * |    2/1997 | King ........................... | 366/337 |
| 6,074,619 A * |    6/2000 | Schoubye ................... | 423/239.1 |
| 6,217,208 B1* |    4/2001 | Schuchardt ............. B01F 5/061 | 366/147 |
| 8,017,084 B1  |    9/2011 | Wirt et al. | |
| 2003/0003029 A1 |  1/2003 | Rogers et al. | |
| 2003/0072214 A1 |  4/2003 | Fleischli et al. | |
| 2004/0182052 A1* | 9/2004 | Snyder ................ B01D 53/508 | 55/418 |
| 2006/0158961 A1* | 7/2006 | Ruscheweyh ......... B01F 5/0451 | 366/337 |
| 2006/0176764 A1 |  8/2006 | Walter et al. | |
| 2008/0056064 A1* | 3/2008 | Tanaka .......................... | 366/339 |
| 2009/0103393 A1* | 4/2009 | Moser .................... B01F 5/0451 | 366/152.1 |
| 2010/0110826 A1* | 5/2010 | D'herde ........................ | 366/337 |
| 2012/0128540 A1* | 5/2012 | Shijo ..................... B01D 53/501 | 422/170 |

FOREIGN PATENT DOCUMENTS

| | | | | |
|---|---|---|---|---|
| CN | 101900018 A |  12/2010 | | |
| CN | 101940886 A |   1/2011 | | |
| CN | 201949798 U |   8/2011 | | |
| EP | 0226879 A1  |   7/1987 | | |
| EP | 0526393 A1  |   2/1993 | | |
| EP | 0638732 B1  |   2/1997 | | |
| EP | 1153650 A1  |  11/2001 | | |
| EP | 1681090 A1  |   7/2006 | | |
| JP | H1085575 A  |   4/1998 | | |
| JP | 2007253094  |  10/2007 | | |
| JP | WO 2011016584 A1 * | 2/2011 | ........... | B01D 53/501 |
| WO | 2005021144 A1 |  3/2005 | | |
| WO | 20110062960 A1 | 5/2011 | | |
| WO | 2012023025 A1 |  2/2012 | | |
| WO | 20120523025 A1 | 2/2012 | | |

OTHER PUBLICATIONS

Haifeng, "Research and Application of Numerical Calculation Methods in SCR DeNOx Reactor & Duct Design", 11th International Conference on Electrostatic Precipitation, pp. 611-615, 2009.

Bible et al., "ASCRTM: Lower NOx Removal Costs Without Sacrificing Performance", Modern Power Systems, pp. 43-46, May 2011.

European Third Party Observations issued in connection with corresponding EP Application No. 12152423.5 on Jan. 30, 2015.

European Third Party Observations issued in connection with corresponding EP Application No. 12152423.5 on Mar. 24, 2015.

* cited by examiner

Fig. 5

GAS MIXING ARRANGEMENT

CROSS REFERENCE TO RELATED APPLICATIONS

This application claims the benefit of European Patent Application number 12152423.5, filed on Jan. 25, 2012, which is incorporated herein by reference in its entirety.

FIELD OF THE INVENTION

The present invention relates to a gas mixing arrangement for mixing a process gas of a power plant, which arrangement comprises a gas duct for flow of said process gas, a mixing plate section arranged in the gas duct and comprising at least one mixing plate arranged at an angle with respect to a main flow direction of said process gas flowing through the gas duct.

BACKGROUND OF THE INVENTION

In the combustion of a fuel, such as coal, oil, natural gas, peat, waste, etc., in a combustion plant, such as a power plant or a waste incineration plant, a process gas is generated. For separating nitrogen oxides, usually denoted NOx, from such a process gas, often referred to as a flue gas, a method is frequently used, in which a reducing agent, usually ammonia or urea, is mixed with the flue gas. The flue gas, mixed with said ammonia or urea, is then passed through a catalyst in which the reducing agent reacts selectively with the NOx to form nitrogen gas and water vapour. Usually the catalyst is installed in a so called Selective Catalytic Reduction reactor (SCR reactor).

In many processes, the concentration of NOx of the flue gas is not evenly distributed over the cross-section of the SCR reactor. This poses a problem, since a stoichiometric ratio between the NOx and the reducing agent is essential for achieving a good reduction of the NOx content of the flue gas and a low slip of the reducing agent from the SCR reactor.

Also, the temperature and/or velocity of the process gas may vary over the cross-section of a gas duct forwarding process gas of a power plant.

U.S. Pat. No. 8,066,424 discloses a mixing device which is arranged in a flow channel for mixing a fluid flowing through the channel. The mixing device has a plurality of mixer disks arranged in mixer disk rows having row axes running across the main direction of flow. The fluid flowing through the system is mixed by leading edge vortices generated by the mixer disks.

Although mixing of process gas is achieved to some extent by the arrangement disclosed in U.S. Pat. No. 8,066,424, a more efficient mixing of process gas of a power plant is desired.

SUMMARY OF THE INVENTION

An object of the present invention is to provide a robust and space-efficient gas mixing arrangement.

This object is achieved by means of a gas mixing arrangement for mixing a process gas of a process plant, which arrangement comprises a gas duct for flow of said process gas, a mixing plate section arranged in the gas duct and comprising at least one mixing plate arranged at an angle with respect to a main flow direction of said process gas flowing through the gas duct, wherein said arrangement further comprises a guide vane section arranged upstream of said mixing plate section to cooperate therewith in mixing the process gas flowing through the gas duct, the guide vane section comprises a first group of guide vanes arranged to direct a first gas flow portion in a direction towards a first side wall of the gas duct, and a second group of guide vanes arranged to direct a second gas flow portion in a direction towards a second side wall of the gas duct, said second side wall being opposite said first side wall.

The inlet conditions of process gas entering the gas duct of the mixing arrangement may vary over the cross-section thereof with regard to, e.g., NOx-concentration, temperature or velocity. The guide vane section mainly serves to alleviate such variation(s). The mixing plate section mainly serves to, in a local manner, further mix the process gas to equalize variations. The guide vane section and the mixing plate section thus cooperate in mixing the process gas flowing through the gas duct, thereby homogenizing the process gas in an efficient manner. The combination of guide vane section and mixing plate section enables a very space-efficient gas mixing arrangement since a sufficient mixing can be achieved although a relatively short distance is utilized. Especially, when a short distance is available for the mixing this is advantageous. By this combination a very compact an efficient gas mixing arrangement is thus achieved. Furthermore, the robust design of the mixing arrangement enables handling of various inlet conditions with respect to the process gas, such as NOx-concentration, temperature and velocity variation without the need for time-consuming tuning. The gas mixing arrangement may be used to homogenize process gas in different types of power plants.

The gas mixing arrangement may be used together with an arrangement for supplying a reducing agent in a power plant having a SCR reactor. For instance the gas mixing arrangement may be used together with an ammonium injection system. The installation of such an ammonium injection system may be costly and tuning thereof to achieve sufficient mixing of the process gas before it enters an SCR may be time-consuming in order. Furthermore, such a system may be sensitive to changes of inlet conditions with respect to the process gas. The use of a gas mixing arrangement according to the present disclosure together with an arrangement for supplying a reducing agent eliminates, or at least reduces, the need for tuning of nozzles of the ammonium injection system since sufficient mixing is achieved by the gas mixing arrangement itself. The gas mixing arrangement thus enables efficient conditioning of process gas resulting in less footprint and costs.

According to one embodiment the guide vanes of the first group of guide vanes are arranged in a first guide vane row extending essentially perpendicular to the main flow direction and the guide vanes of the second group of guide vanes are arranged in a second guide vane row extending essentially perpendicular to the main flow direction through the gas duct.

The first and second guide vane rows are preferably arranged essentially in parallel with each other to enable an even more compact arrangement. Also, this further enhance the mixing of process gas flowing through the gas duct since the groups of guide vanes then cooperate in directing portions of process gas in an efficient manner.

Preferably, the guide vane section comprises at least one further group of guide vanes arranged to direct a third gas flow portion in a direction towards either one of the first and the second side wall of the gas duct.

According to one embodiment the guide vane section comprises a third group of guide vanes arranged to direct a third portion of the process gas in a direction towards the first side wall and a fourth group of guide vanes arranged to direct a fourth portion of the process gas in a direction towards the second side wall.

The gas mixing arrangement may comprise at least one further guide vane section arranged downstream of the first guide vane section in order to even further improve the mixing of process gas.

In one embodiment said at least one further guide vane section comprises a first group of guide vanes arranged to direct a portion of the process gas in a direction towards a third side wall of the gas duct, and a second group of guide vanes arranged to direct a portion of the process gas in a direction towards a third side wall of the gas duct, said fourth side wall being opposite said third side wall.

Preferably, each group of guide vanes comprises at least one guide vane having a curvilinear shape. This has the advantage that process gas is directed in a very smooth manner, thereby minimizing pressure drops in the gas duct.

In one embodiment groups of guide vanes next to one another partly overlap with respect to the main flow direction through the gas duct.

Preferably, the distance between the guide vane section and the mixing plate section measured along the main flow direction of the gas duct is less than 15 m in order to achieve a compact yet efficient gas mixing arrangement.

According to one embodiment the distance between the guide vane section and the mixing plate section measured along the main flow direction of the gas duct may be less than 10 m, typically between 0.2 m and 10 m.

Preferably, the mixing plate section comprises a plurality of mixing plates arranged in the gas duct over its cross section as seen with respect to the main flow direction through said gas duct. This will further enhance the mixing of process gas flowing through the gas duct.

In one embodiment a plurality of mixing plates are arranged in a first mixing plate row and neighbouring mixing plates in said mixing plate row are alternately arranged at a positive angle and at a negative angle with respect to the main flow direction through the gas duct. This has the advantage that vortices generated by each mixing plate interact in an efficient manner to form a mixing zone downstream of the mixing plates.

In one embodiment the mixing plate section further comprises a second mixing plate row, the first and second mixing plate rows being symmetrically arranged with respect to the cross section of the gas duct.

Preferably, the at least one mixing plate has a triangular shape in order to achieve efficient local mixing of the process gas by vortices generated by the mixing plate.

Preferably, a major surface of the at least one mixing plate represents a projected area over the cross section of the gas duct as seen in its flow direction representing 30-50%, more preferred 35-45% and most preferred 38-42% of the cross sectional area of the gas duct.

Another object of the present invention is to provide an improved arrangement for supplying a reducing agent into a process gas of a power plant.

This object is achieved by means of an arrangement for supplying a reducing agent which arrangement comprises a reducing agent injection system and a gas mixing arrangement according to the present disclosure.

In one embodiment the reducing agent is ammonium or urea supplied in dry form.

In one embodiment the reducing agent injection system is arranged upstream of the guide vane section with respect to the main flow direction of the gas duct.

In one embodiment the reducing agent injection system is an ammonia injection system.

BRIEF DESCRIPTION OF THE DRAWINGS

The invention will now be described in more detail with reference to the appended drawings in which.

DESCRIPTION OF PREFERRED EMBODIMENTS

Figure 1:
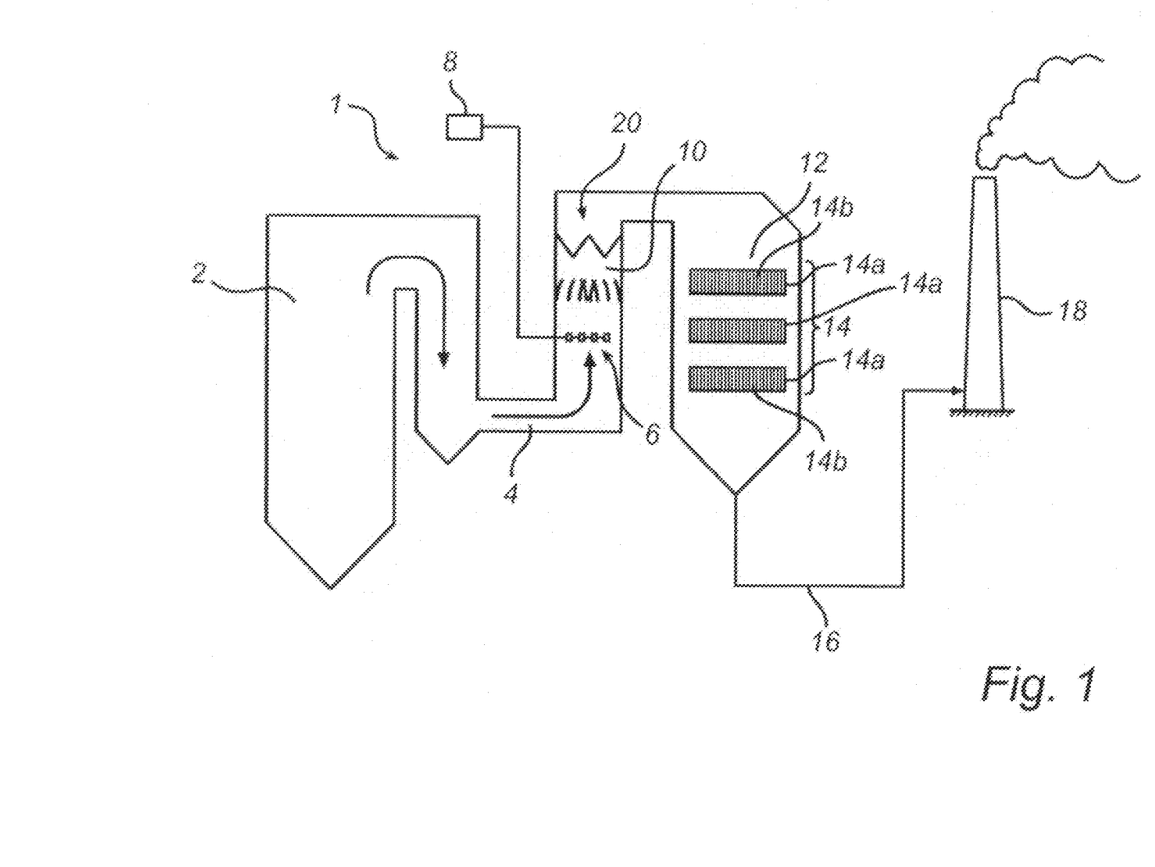
FIG. 1 is a schematic side cross sectional view of a coal fired power plant.

FIG. 1 is a schematic side view illustration of a power plant 1. The power plant 1 comprises a coal fired boiler 2. In the coal fired boiler 2 coal is combusted in the presence of air, thereby generating a flow of a process gas in the form of a flue gas that leaves the coal fired boiler 2 via a duct 4. Through duct 4 the flue gas passes to an ammonia injection system 6. In the ammonia injection system 6 gaseous ammonia, NH3, is added to the flue gas and is thoroughly mixed with the flue gas. The gaseous ammonia is supplied to the ammonia injection system 6 from an ammonia supply system 8. The flue gas leaves the ammonia injection system 6 via a duct 10 and passes a gas mixing arrangement 20 as disclosed in more detail below. After passing the mixing arrangement 20 the flue gas flows to an inlet of a selective catalytic reduction (SCR) reactor 12. The SCR reactor 12 comprises one or more consecutive layers 14 of SCR-catalyst 14a located inside the SCR reactor 12. This SCR catalyst 14a comprises a catalytically active component 14b, such as vanadium pentoxide or wolfram trioxide, applied to a ceramic carrier material so as to comprise, e.g., a honey-comb structure or a plate structure. In the SCR reactor 12 the nitrogen oxides, NOx, in the flue gas react with the ammonia injected by means of the ammonia injection system 6 to form nitrogen gas, $N_2$. The flue gas then leaves the SCR-reactor 12 via a duct 16 and is emitted into the atmosphere via a stack 18. It will be appreciated that the power plant 1 may comprise further gas cleaning devices, such as particulate removers, such as electrostatic precipitators, and such as wet scrubbers. For reasons of maintaining clarity of illustration in the drawings, such further gas cleaning devices are not shown in FIG. 1. Typically, the concentration of NOx of the flue gas flowing from the boiler is not evenly distributed over the cross-section of the duct 10. Also the temperature and/or velocity of the flue gas may vary over the cross-section of the duct 4. To this end, the power plant 1 comprises the gas mixing arrangement 20.

Figure 2:
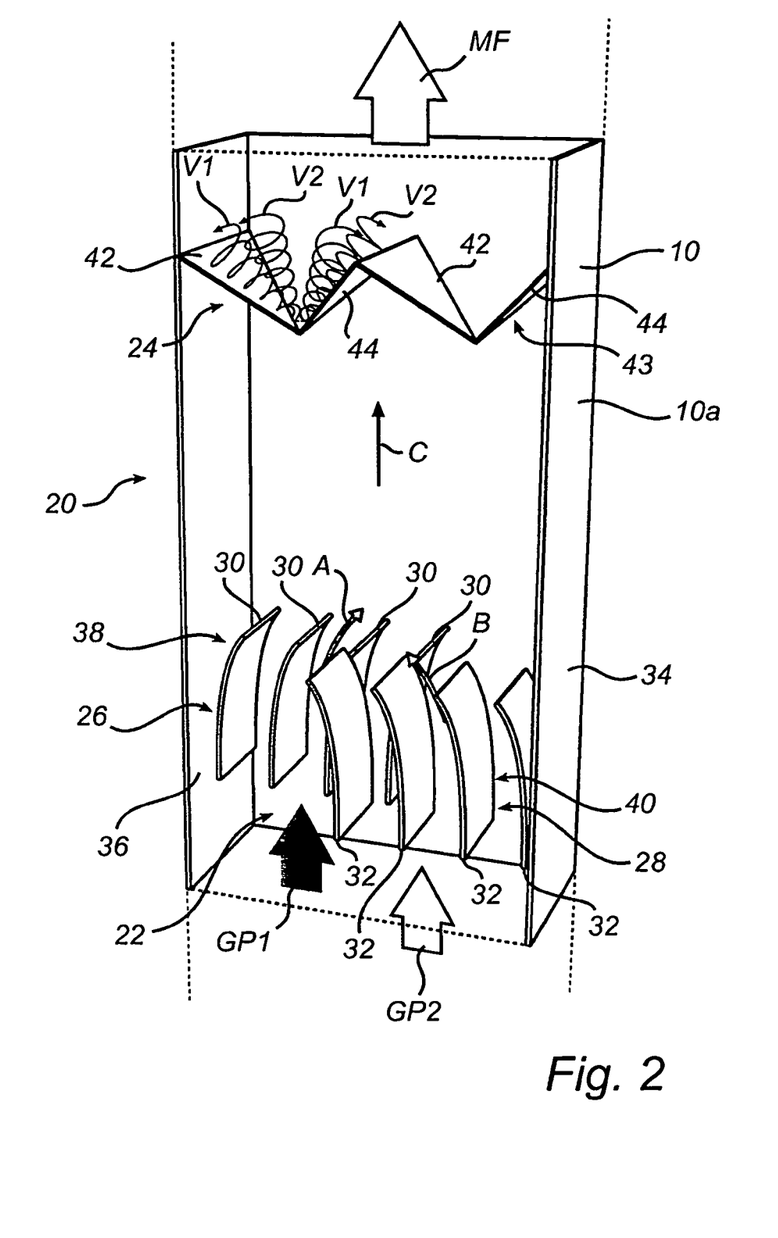
FIG. 2 is a schematic perspective side cross sectional view illustrating a gas mixing arrangement according to an embodiment of the present disclosure.
Figure 3:
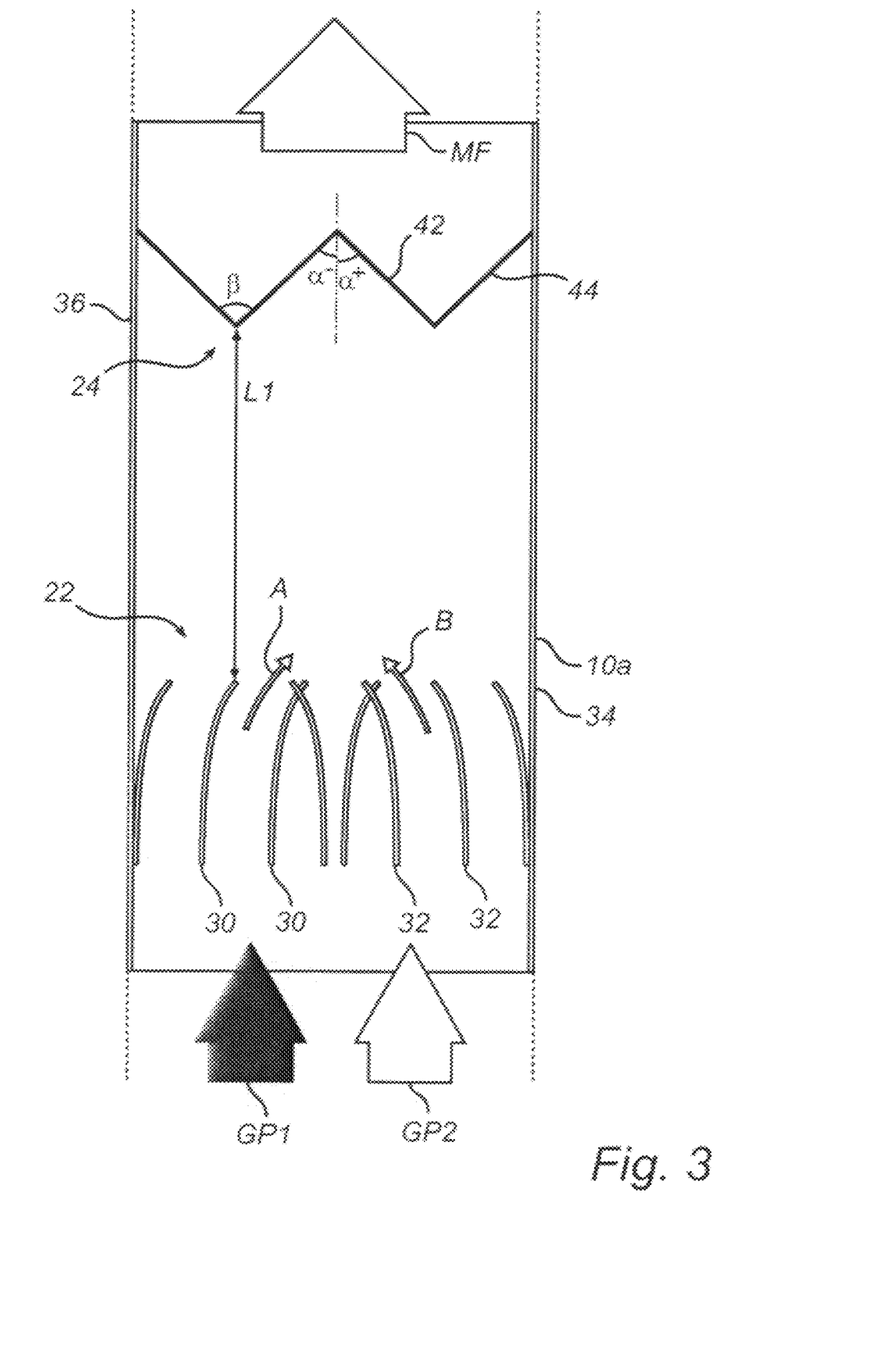
FIG. 3 is a schematic side cross sectional view of the gas mixing arrangement in FIG. 2.

Referring to FIGS. 2 and 3, the mixing arrangement 20 will now be further described. FIG. 2 is a schematic perspective side cross sectional view of the duct 10 illustrating a gas mixing arrangement 20 according to an embodiment of the present disclosure. FIG. 3 shows a schematic side cross sectional view of the gas mixing arrangement 20. The gas mixing arrangement 20 comprises a portion 10a of the gas duct 10, a guide vane section 22 and a mixing plate section 24 which is arranged downstream of the guide vane section 22 as seen with respect to a main flow direction C of flue gas flowing through the gas duct 10. The gas main flow is illustrated by the arrow MF in FIG. 2. The guide vane section 22 mainly serves to direct gas from one side to an opposite side of the gas duct 10 in order to, in a global manner, equalize variations, such as, e.g., NOx concentration, temperature or velocity variation over the cross section of the duct 10 of flue gas entering the gas mixing arrangement 20. The mixing plate section 24 mainly serves to, in a local manner, further equalize variations of the flue gas forwarded through the gas duct portion 10a. The guide vane section 22 thus cooperates with the mixing plate section 24 in mixing the flue gas forwarded through the duct 10. The combination of guide vane section 22 and mixing plate section 24 results in a very space efficient gas mixing arrangement 20. Without the gas mixing arrangement 20 a significantly longer distance measured in the main flow direction would have been required to achieve a sufficient degree of mixing of the flue gas.

The guide vane section 22 comprises a first 26 and a second 28 group of guide vanes. The number of guide vanes, their geometry and location in each group of guide vanes depends on different factors, such as e.g. the type of process plant and requirements as regards chemical composition, temperature and velocity of the process gas leaving the gas mixing arrangement 20. In this embodiment each of the first 26 and second 28 group of guide vanes comprises 4 guide vanes 30, 32. The guide vanes 30 of the first group of guide vanes 26 are arranged to direct a first gas flow portion GP1 in a direction towards a first side wall 34 of the gas duct 10a, as schematically illustrated by arrow A in FIGS. 2 and 3. The guide vanes 32 of the second group of guide vanes 28 are arranged to direct a second gas flow portion GP2 in a direction towards a second side wall 36, which is opposite the first side wall 34, as schematically illustrated by arrow B in FIGS. 2 and 3. The guide vanes 30 of the first group 26 of guide vanes are arranged in a first guide vane row 38 extending over a first portion of the cross section of the gas duct portion 10a as seen in the main flow direction C thereof. The guide vanes 32 of the second group of guide vanes 28 are arranged in a second guide vane row 40 extending over a second portion of the cross section of the gas duct portion 10a as seen in the main flow direction C thereof. Each guide vane 30, 32 of the first 38 and second 40 guide vane rows is thus arranged along a respective row axis extending essentially across the main flow direction C. The first 38 and second 40 guide vane rows are arranged next to each other at the same level of the gas duct portion 10a as seen in the main flow direction C. Hence, the first 38 and second 40 guide vane rows are arranged in parallel with each other. The length of each guide vane row is greater than half of the cross sectional length of the gas duct 10, as best illustrated in FIG. 3. The guide vane rows 38, 40 thus overlap one another as seen over the cross section of the gas duct 10. The first 38 and second 40 guide vane rows together forms a pair of guide vane rows.

The gas duct portion 10a has in this case a rectangular cross-section. Each guide vane 30, 32 is arranged with a first and second straight edge thereof parallel to each of the first 34 and second 36 side wall. Each guide vane row 38, 40 has an outer guide vane arranged next to a respective side wall 34, 36 of the gas duct, as illustrated best in FIG. 3. A lower straight edge of each such outer guide vane is arranged adjacent to a corresponding side wall, in order to avoid that flue gas passes the guide vane section 22 without being directed towards a side wall 34, 36. The first guide vane row 38 thus has an outer guide vane 30 arranged adjacent to the second side wall 36 and the second guide vane row 40 has an outer guide vane 32 arranged adjacent to the first side wall 34, as best illustrated in FIG. 3.

In order to direct flue gas in a smooth manner and to avoid large pressure drops in the gas duct 10 each guide vane 30, 32 has a curvilinear shape, as best illustrated in FIG. 3. Each of the guide vanes 30, 32 may e.g. be curvilinear with a constant radius of curvature. Each of the guide vanes 30, 32 is arranged with its convexity facing a corresponding side wall, i.e. the second side wall 36 and the first side wall 34, respectively.

The mixing plate section 24 comprises four static triangular mixing plates 42, 44 arranged in a row 43 over the full cross-section of the gas duct 10a as seen in the main flow direction C. Each mixing plate 42, 44 is arranged at an angle of attack $\alpha^+$, $\alpha^-$ with respect to the main flow direction C through the duct 10, as illustrated in FIG. 3. Hence, each mixing plate 42, 44 is arranged with its major surface forming an angle with respect to the main flow direction C. Neighbouring mixing plates 42, 44 of the mixing plate row are alternately arranged at a positive angle $\alpha^+$ and at a negative angle $\alpha^-$ with respect to the main flow direction C through the gas duct 10, as illustrated in FIG. 3.

Preferably, the mixing plates 42, which are arranged at a positive angle $\alpha^+$, form an angle with respect to an axis parallel to the main flow direction C through the duct 10 corresponding to an angle in the range between 20 and 50 degrees and the mixing plates 44, which are arranged at a negative angle $\alpha^-$, form an angle with respect to an axis parallel to the main flow direction C corresponding to an angle in the range between −25 and −50 degrees.

Neighbouring mixing plates 42, 44 are arranged with their major surfaces forming an angle β with respect to each other corresponding to two times the quantitative value of the angle $\alpha^+$, $\alpha^-$ the respective mixing plates 42, 44 form with respect to the main flow direction C through the gas duct 10.

Each mixing plate generates vortices V1, V2 at the leading edge thereof. In FIG. 2 vortices V1, V2 generated by two of the mixing plates are schematically illustrated. The rotation of these vortices causes flow components normal to the main flow direction C which locally mix portions of the flue gas flowing through the duct 10. In this embodiment each mixing plate 42, 44 has a geometry representing a generally triangular geometry generating essentially two major vortices V1, V2 emerging along the lateral opposing edges of the mixing plate, as schematically illustrated in FIG. 2. However, it is appreciated that mixing plates may have a geometry representing another geometry, such as e.g. a rectangular, circular, elliptical, or parabola geometry.

The two vortices V1, V2 thus formed along the lateral edges of each mixing plate 42, 44 will rotate in opposite directions towards the longitudinal center axis of the respective mixing plate 42, 44 and have a diameter gradually increasing as the distance from the mixing plate increases downstream thereof.

The mixing plate section 24 is arranged downstream of the guide vane section 22 and cooperates with the guide vane section 22 in mixing flue gas forwarded through the gas duct 10. The distance L1 between the guide vane section 22 and the mixing plate section 24 measured in the main flow direction C depend on different parameters, such as the cross-sectional area of the gas duct 10a, the geometry and orientation of the guide vanes 30, 32 etc. Hence, the distance L1 between the guide vane section 22 and the mixing plate section 24 may be optimized for a certain application.

Preferably, the shortest distance between an upper end of the guide vane section 22 and a lower end of the mixing plate section 24 measured along the main flow direction of the gas duct is less than 15 m. According to one embodiment the shortest distance L1 between the guide vane section 22 and the mixing plate section 24 measured along the main flow direction of the gas duct 10a, as illustrated in FIG. 3, may be less than 10 m, typically between 0.2 m and 10 m. As indicated in FIG. 3 the distance L1 is measured between an upper end of the guide vane section 22 and an lower end of the mixing plate section 24. By combining a flow directing device 22 comprising guide vanes 30, 32 and vortex generating mixing device 24 comprising mixing plates 42, 44 a compact yet efficient mixing with respect to variations as regards e.g. temperature, chemical composition and velocity of the process gas is achieved as will be described hereinafter.

Now referring to FIGS. 1-3, the function of the gas mixing arrangement 20 will be described. A stream of flue gas generated in the boiler 2 of the power plant flows from the boiler 2 towards the SCR reactor 12 while passing the gas mixing arrangement 20. Typically, the concentration of NOx and/or temperature of the flue gas forwarded from the boiler 2 is not evenly distributed over the cross section of the duct 4. Also the temperature and/or velocity of the flue gas may vary over the cross-section of the duct 4.

Through duct 4, the flue gas flows to the ammonia injection system 6. In the ammonia injection system 6, gaseous ammonia, $NH_3$, is added to the flue gas. The flue gas then enters the duct 10. A first gas flow portion GP1, as seen with respect to the cross section of the gas duct, is subjected to a change of flow direction by the first group of guide vanes 30, as schematically illustrated by arrow A in FIGS. 2 and 3. The first gas flow portion GP1 is directed in a direction toward the first side wall 34. A second gas flow portion GP2 of the flue gas, as seen with respect to the cross section of the gas duct, is subjected to a change of flow direction by the second group of guide vanes 32, as schematically illustrated by arrow B in FIGS. 2 and 3. The second gas flow portion GP2 is directed in a direction toward the second side wall 36. Thereby, a global mixing, as seen over the cross section of the gas duct 10a, of the first GP1 and second GP2 gas flow portions, passing through the guide vane section 22 is achieved. Flue gas passing the guide vane section 22 is directed in a very smooth manner since each guide vane 30, 32 is curvilinear with a radius of curvature. Furthermore, the orientation of the guide vanes 30, 32 is adapted to minimize disturbance of the flow while directing gas towards a respective side wall of the gas duct 10. The mixed flue gas is then subjected to further mixing caused by vortices V1, V2 generated by the mixing plates 40, 42. Shortly after the mixing plate section 24, as seen in the main flow direction C, the flue gas is sufficiently mixed. The directing of flue gas by the guide vane 30, 32 of the guide vane section 24 in combination with the turbulence caused by the mixing plates 40, 42 of the mixing plate section 24 have shown to result in a very efficient mixing of flue gas over the cross section of the gas duct 10. The concentration of NOx in the flue gas has as well as the temperature profile, by the inventive gas mixing arrangement, proven to have a surprisingly even distribution over the cross sectional area of the SCR reactor inlet. By this combination a very compact and efficient gas mixing arrangement is achieved.

Figure 4:
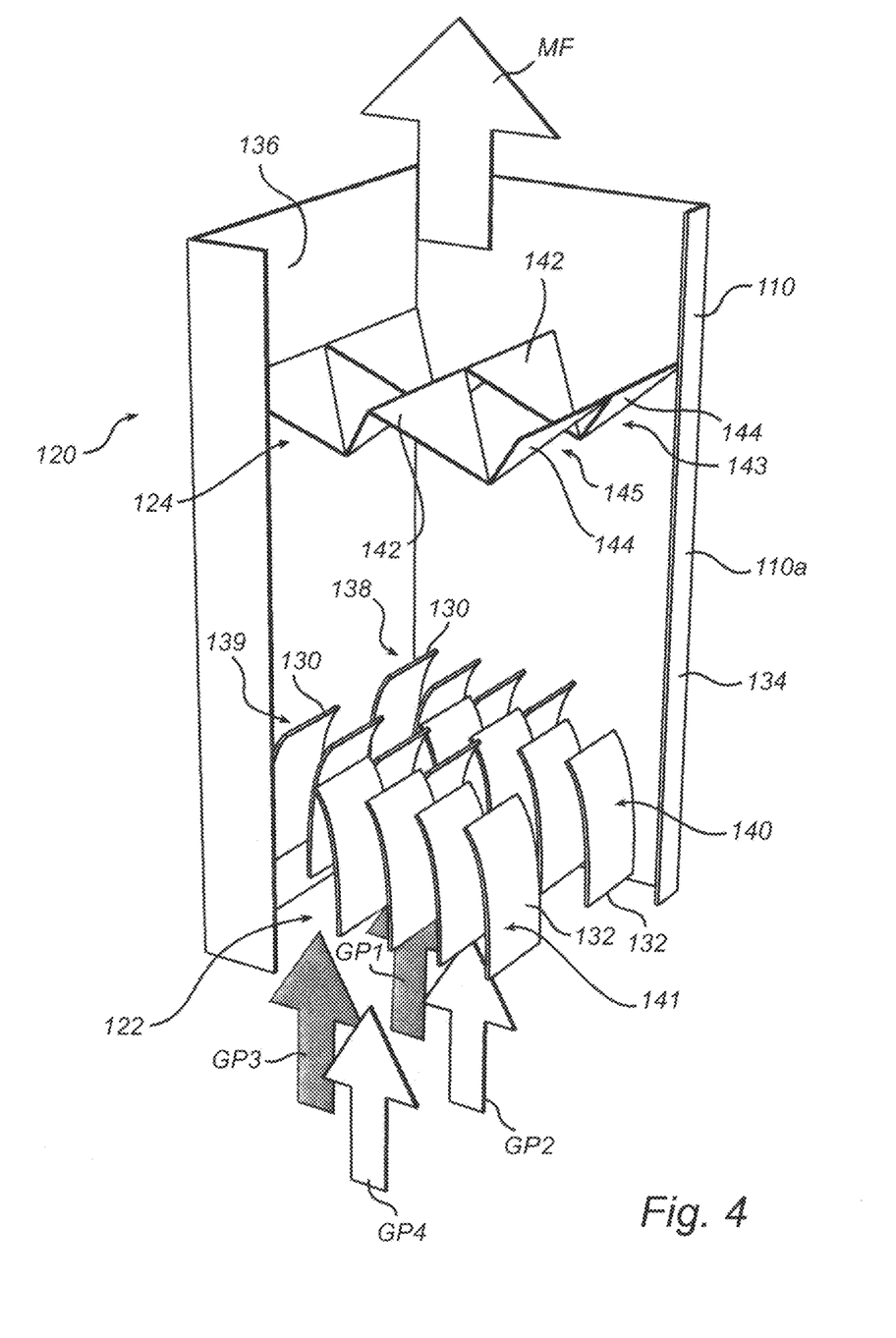
FIG. 4 is a schematic perspective side cross sectional view illustrating a gas mixing arrangement according to a second embodiment of the present disclosure.

Hereinafter a mixing arrangement 120 according to a second embodiment of the present disclosure will be described with reference to FIG. 4. Many features disclosed in the first embodiment are also present in the second embodiment with similar reference numerals identifying similar or same features. Having mentioned this, the description will focus on explaining the differing features of the second embodiment.

In the second embodiment the guide vane section 122 comprises, in addition to a first 138 and a second 141 guide vane row, a third group of guide vanes arranged in a third guide vane row 139 and a fourth group of guide vanes arranged in a fourth guide vane row 141. The third 139 and fourth 141 guide vane rows together forms a second pair of guide vane rows. The guide vanes of the third guide vane row 139 are arranged to direct a flue gas portion GP3 in a direction towards the first side wall 134 and the guide vanes of the fourth guide vane row 141 are arranged to direct a flue gas portion GP4 in a direction towards the first side wall 136. In this embodiment the mixing plate section 124 comprises a first 143 and a second 145 row of mixing plates 142,144. The first 143 and second 145 mixing plate rows are arranged in parallel with each other with respect to the main flow direction through the gas duct 110a.

Figure 5:
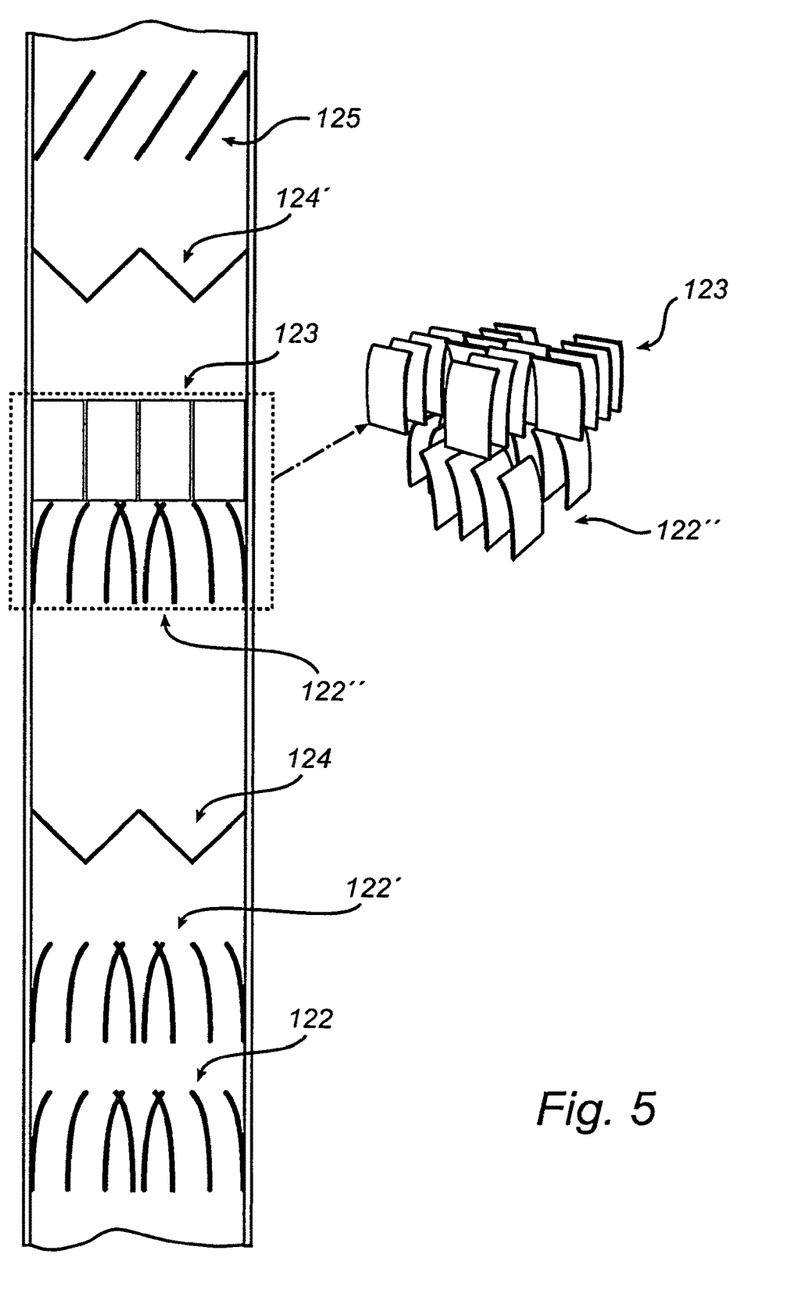
FIG. 5 is a schematic side cross sectional view illustrating a gas mixing arrangement according to a third embodiment of the present disclosure.

Hereinafter a mixing arrangement according to a third embodiment will be described with reference to FIG. 5. Many features disclosed in the first and second embodiments are also present in the third embodiment with similar reference numerals identifying similar or same features. Having mentioned this, the description will focus on explaining the differing features of the second embodiment.

In the third embodiment the gas mixing arrangement comprises four guide vane sections 122, 122', 122", 123 and three mixing plate sections 124, 124', 125. A first guide vane section 122 comprises a first group of guide vanes arranged to direct flue gas towards a first side wall and a second group of guide vanes arranged to direct process gas towards a second side wall. A second guide vane section 122', which has the same number of guide vanes and configuration as the first guide vane section 122, is arranged downstream of the first guide vane section 122. A mixing plate section 124 is arranged downstream of the second guide vane section 122'. A third guide vane section 122", which also has the same number of guide vanes and configuration as the first guide vane section 122, is arranged downstream of the mixing plate section 124. A fourth guide vane section 123 is arranged downstream of the third guide vane section 122". The fourth guide vane section 123 differs from the first 122, second 122' and third 122" guide vane sections in that a first and a second group of guide vanes thereof are arranged to direct gas towards a third and a fourth side wall, respectively, as illustrated in perspective view of the third 122" and fourth 123 guide vane sections in FIG. 5. A second mixing plate section 124' is arranged downstream of the fourth guide vane section 123. A third mixing plate section 125 is arranged downstream of the second mixing plate section 124'. The third mixing plate section 125 differs from the first 124 and second 124' mixing plate sections in that each of the mixing plates thereof is arranged at a negative angle to the main flow direction through the gas duct portion. The different guide vane section configurations disclosed hereinbefore serves as examples of how a guide vane section may be designed. It is appreciated that the number of guide vanes, the shape thereof and the position of each guide vane may be optimized such that a sufficient level of mixing is achieved while minimizing pressure drops. Similarly the different mixing plate section configurations disclosed hereinbefore serves as examples of how the mixing plate section may be designed.

It will be appreciated that numerous variants of the embodiments described above are possible within the scope of the appended claims.

Hereinbefore it has been described that the gas duct portion 10a of the gas mixing arrangement 20 has a rectangular cross-section. It will be appreciated that other cross sections, such as circular or elliptical cross-sections, may be possible to use in a gas mixing arrangement according to the present disclosure. Also, the cross-section of the gas duct may vary as seen along the main flow direction through the gas duct 10a.

It has been described hereinbefore, with reference to FIG. 1, that the present invention can be utilized for mixing process gas generated in a coal fired boiler. It will be appreciated that the invention is useful also for mixing other types of process gases, including process gases generated in oil fired boilers, incineration plants, including waste incineration plants, cement kilns, blast furnaces and metallurgical plants including sinter belts etc.

To summarize, a gas mixing arrangement for mixing a process gas MF of a process plant, which arrangement comprises a gas duct 10a for flow of said process gas, a mixing plate section 24 arranged in the gas duct 10a and comprising at least one mixing plate 40, 42 arranged at an angle α with respect to a main flow direction C of said process gas flowing through the gas duct 10a. The arrangement further comprises a guide vane section 22 arranged upstream of said mixing plate section 24 to cooperate therewith in mixing the process gas MF flowing through the gas duct 10a, the guide vane section 22 comprises a first group of guide vanes 26 arranged to direct a first gas flow portion GP1 in a direction towards a first side wall 34 of the gas duct 10a, and a second group of guide vanes 28 arranged to direct a second gas flow portion GP2 in a direction towards a second side wall 36 of the gas duct 10a, said second side wall 36 being opposite said first side wall 34.

The invention claimed is:

1. A gas mixing arrangement for mixing a process gas of a process plant, comprising:
 a gas duct including a front wall, a back wall, a first side wall and a second side wall, for flow of said process gas;
 a mixing plate section arranged in the gas duct comprising at least one mixing plate row with a plurality of triangular mixing plates each in upstream apex to apex contact and downstream edge to edge contact one with another arranged to alternate between a positive angle and a negative angle between gas duct parallel first side wall and second side wall; and
 a guide vane section arranged in the gas duct upstream of said mixing plate section to cooperate therewith in mixing the process gas flowing through the gas duct, wherein the guide vane section comprises
 in a cross section of the gas duct between the front wall and the back wall each a first row of quadrilateral guide vanes arranged adjacent the front wall and distanced by at least a second row of quadrilateral guide vanes from the back wall, and the second row of quadrilateral guide vanes arranged adjacent the back wall and distanced by at least the first row of quadrilateral guide vanes from the front wall, with the first row of quadrilateral guide vanes arranged to direct a first gas flow portion in a direction towards a first side wall of the gas duct, with the first row of quadrilateral guide vanes arranged next to, parallel to, and in partial overlap of the second row of quadrilateral guide vanes, with the second row of quadrilateral guide vanes arranged to direct a second gas flow portion in a direction towards a second side wall of the gas duct, said second side wall being opposite said first side wall;
 wherein a width extending from the front wall towards the back wall of the edge of a triangular mixing plate of the plurality of triangular mixing plates is about the same as a combined width extending from the front wall towards the back wall of the first row of quadrilateral guide vanes and the second row of quadrilateral guide vanes.

2. The gas mixing arrangement according to claim 1, wherein the first row of quadrilateral guide vanes is arranged in a row perpendicular to the gas duct parallel first side wall and second side wall, and the second row of quadrilateral guide vanes is arranged in a row perpendicular to the gas duct parallel first side wall and second side wall.

3. The gas mixing arrangement according to claim 1, wherein a length of each guide vane row is greater than half of a cross sectional length of the gas duct.

4. The gas mixing arrangement according to claim 1, wherein the guide vane section comprises at least one further group of guide vanes arranged to direct a third gas flow portion in a direction towards either the first side wall or the second side wall of the gas duct.

5. The gas mixing arrangement according to claim 1, further comprising at least one further guide vane section arranged downstream of the first guide vane section.

6. The gas mixing arrangement according to claim 1, wherein each row of quadrilateral guide vanes comprises at least one guide vane having a curvilinear shape.

7. The gas mixing arrangement according to claim 1, wherein rows of quadrilateral guide vanes each comprise at least one guide vane having a curvilinear shape arranged next to one another to partly overlap.

8. The gas mixing arrangement according to claim 1, wherein a distance between the mixing plate section and the guide vane section measured along the gas duct parallel the first side wall and the second side wall is less than 15 m.

9. The gas mixing arrangement according to claim 1, wherein the mixing plate section comprises a plurality of mixing plates arranged in the gas duct over a cross section perpendicular to the gas duct parallel the first side wall and the second side wall.

10. The gas mixing arrangement according to claim 9, wherein said plurality of mixing plates are arranged in a first mixing plate row and a second mixing plate row.

11. The gas mixing arrangement according to claim 10, wherein the mixing plate rows are symmetrically arranged with respect to the cross section of the gas duct.

12. The gas mixing arrangement according to claim 1, wherein each mixing plate of the at least one mixing plate row has a triangular shape.

13. The gas mixing arrangement according to claim 1, wherein a major surface of the at least one angled mixing plate represents a projected area over a cross section perpendicular to the gas duct parallel the first side wall and the second side wall representing 30-50% of the cross-sectional area of the gas duct.

14. A reducing agent supply system comprising a reducing agent injection system and a gas mixing arrangement according to claim 1.

15. A reducing agent supply system according to claim 14, wherein the reducing agent injection system is arranged upstream of the gas mixing arrangement within the gas duct.

* * * * *